Sept. 29, 1925.  1,555,060

M. I. JACKSON

PRESSING BUCK

Filed April 2, 1923

MARTIN I. JACKSON
INVENTOR

BY Victor J. Evans
ATTORNEY

Patented Sept. 29, 1925.

1,555,060

UNITED STATES PATENT OFFICE.

MARTIN I. JACKSON, OF CHICAGO, ILLINOIS.

PRESSING BUCK.

Application filed April 2, 1923. Serial No. 629,461.

*To all whom it may concern:*

Be it known that I, MARTIN I. JACKSON, a citizen of the United States, residing at Chicago, in the county of Cook and State of Illinois, have invented new and useful Improvements in Pressing Bucks, of which the following is a specification.

This invention relates to bucks used in pressing men's clothes, and an object of the invention is to provide an electrically heated buck by means of which heat may be applied to the garment, and also to provide a buck which may be detachably and reversibly attached to the tables of pressing machines without requiring alterations to the pressing machines.

Another object of this invention is to provide a reversible electrically heated buck as specified which is particularly designed for use in opening edges, pressing the seams of clothing, pressing the seams of sleeves, and also to provide a buck which comprises a substantially oval shaped end portion particularly designed to facilitate the pressing of the shoulders in coats, and also the pressing of armholes in coats.

A further object of this invention is to provide an electrically heated buck as specified with which a multiple pole switch is associated to permit various degrees of heating of the heating element of the buck.

Other objects of the invention will appear in the following detailed description taken in connection with the accompanying drawings wherein:—

Figure 1:
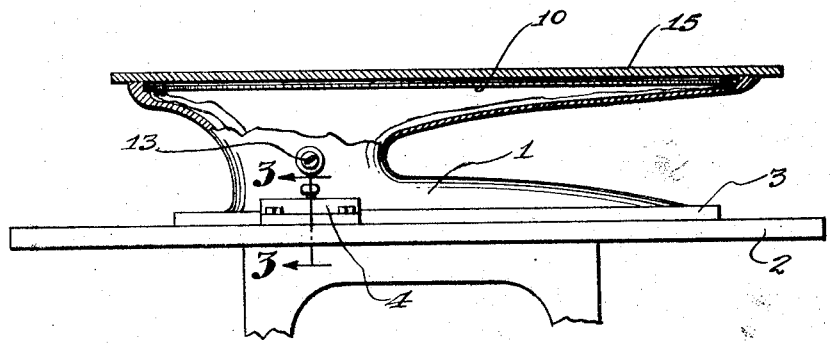
Fig. 1 is a side elevation partly in section of the improved buck.
Figure 2:
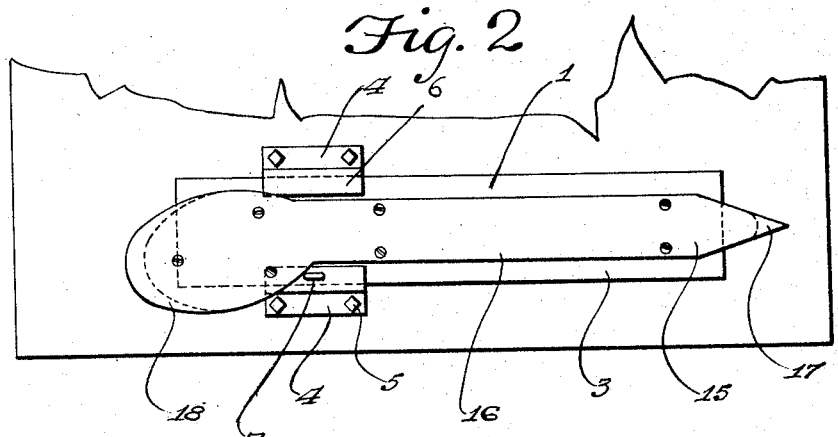
Fig. 2 is a top plan of the buck.
Figure 3:
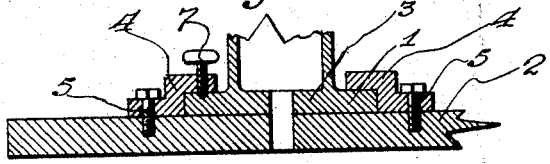
Fig. 3 is a vertical section on the line 3—3 of Fig 1.

Referring more particularly to the drawings, the buck 1 which is particularly designed for use by tailors or tailoring concerns for pressing the edges, seams, sleeves, shoulders and armholes of clothing, during their making, is adapted to be used in connection with the table 2 of any suitable type of pressing machine. The buck 1 has a base 3 which rests upon the table top 2 and it is removably clamped thereagainst by means of the clamps 4. The clamps 4 are detachably bolted by means of bolts 5 to the table 2 and they comprise flanges 6 which engage over the edges of the base 3 of the buck. Set screw 7 extends through one of the flanges 6 for securely clamping the buck in position in such manner as to permit its quick detachment from or reversing relative to the table.

The body of the buck 1 is hollow as clearly shown in Fig. 1 of the drawings and it receives therein an electric heating element 10 which is constructed in the usual manner, comprising a main body 11 of insulating material about which two resistance wires 12 are coiled to provide the desired heat when an electric current is passed through the wires. The passing of an electric current through the wires is controlled by means of any well-known type of switch 13.

A removable plate 15 is provided which is detachably connected to the main body of the buck 1 and forms a closure for the body, entirely enclosing the heating element 10 and projecting beyond the edges of the body 1 and also it provides an ironing surface. The top of the buck body 1 and the plate 15 are shaped to provide a relatively long flat surface 16, the sides of which are parallel and one end of which terminates in a point 17, while the opposite end merges into an oval shaped projection 18. The oval shaped projection 18 has its major axis positioned at an acute angle to the longitudinal axis of the flat relatively long portion 16 and it is positioned in this manner so that the pressing of the shoulders and armholes in coats may be done more easily than heretofore.

Figure 4:
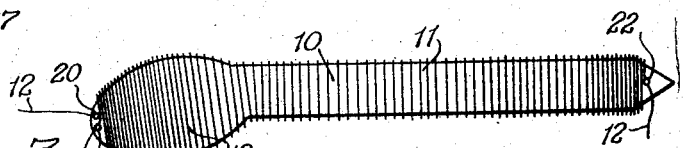
Fig. 4 is a top plan of the electric heating element.

The switch employed should be a multiple pole switch, so as to permit different degrees of heat of the heating element 10. The resistance wires 12 of the heating element are connected to spaced contacts 20 and 21 at one end of the heating element 10, and to a contact 22 at the opposite end, as shown in Figure 4. When the maximum heating properties of the heating element is to be utilized the circuit is closed through the switch 13, that is so that it flows through both of the resistance wires 12.

From the foregoing description taken in connection with the accompanying drawings it will be apparent that the buck structure 1 may be quickly and easily attached to the table of a pressing machine, and after the seams, sleeves and open edges of a garment have been pressed, the position of the buck may be quickly and easily reversed to position the round end 18 in operative position for the purpose of pressing the shoulders and armholes of the garment. It will also be apparent that by manipulation of the switch the heating of the buck and of the removable plate 15 may be regulated as desired or as necessary.

It is, of course, to be understood that the invention may be constructed in other manners and the parts associated in different relations and, therefore, I do not desire to be limited in any manner except as set forth in the claims hereunto appended.

Having thus described my invention what I claim is:—

1. A pressing buck comprising a pressing surface including a relatively long narrow portion having its forward end pointed, and a substantially oval shaped portion at the end of said long narrow portion opposite from said pointed end.

2. A pressing buck comprising a pressing surface including a relatively long narrow portion having its forward end pointed, and a substantially oval shaped portion at the end of said long narrow portion opposite from said pointed end, said oval portion having its major axis disposed at an acute angle to the longitudinal axis of the long narrow portion.

3. A pressing buck comprising a body having a recess therein, an electric heating element within said body, a removable plate forming a closure for the recess in the body and providing a pressing surface, said removable plate and its receiving portion of said buck being shaped to provide a relatively long narrow portion having parallel sides terminating in a point at one end, and a substantially oval shaped portion at the end of said long narrow portion remote from its pointed end.

4. A pressing buck comprising a body having a recess therein, an electric heating element within said body, a removable plate forming a closure for the recess in the body and providing a pressing surface, said removable plate and its receiving portion of said buck being shaped to provide a relatively long narrow portion having parallel sides terminating in a point at one end, and a substantially oval shaped portion at the end of said long narrow portion remote from its pointed end, said substantially oval portion having its major axis disposed at an acute angle with respect to the longitudinal axis of the long narrow portion.

In testimony whereof I affix my signature.

MARTIN I. JACKSON.